C. I. HALL.
SYSTEM FOR RECORDING METER OPERATIONS.
APPLICATION FILED MAR. 10, 1913. RENEWED JULY 14, 1916.
1,221,443.  Patented Apr. 3, 1917.
2 SHEETS—SHEET 1.
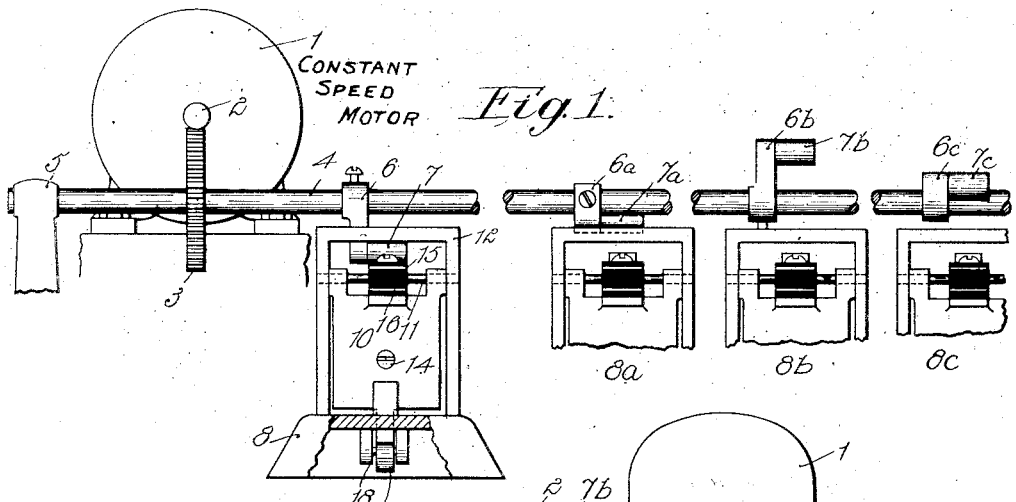
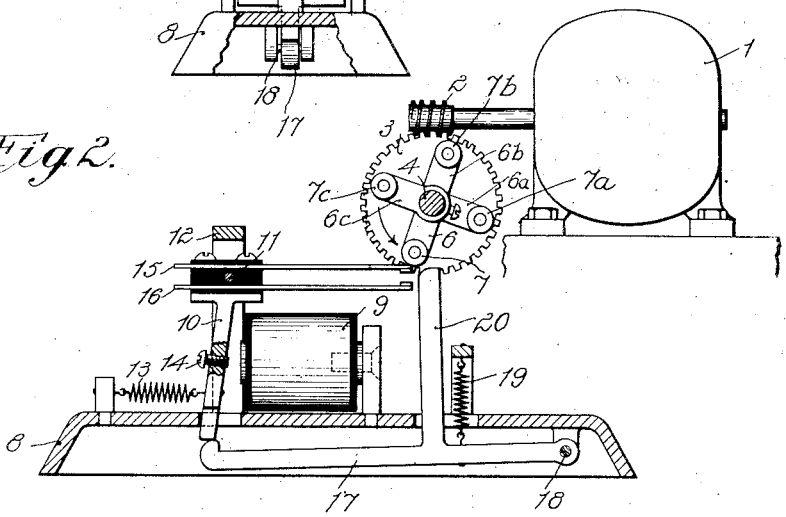
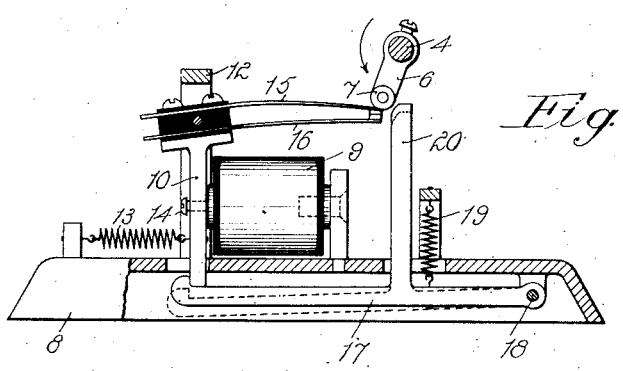
Witnesses:
Leslie W. Fricke
Robert F. Bracke
Inventor
Chester I. Hall
By Brown Williams Bell Hanson & Boettcher
Attorneys

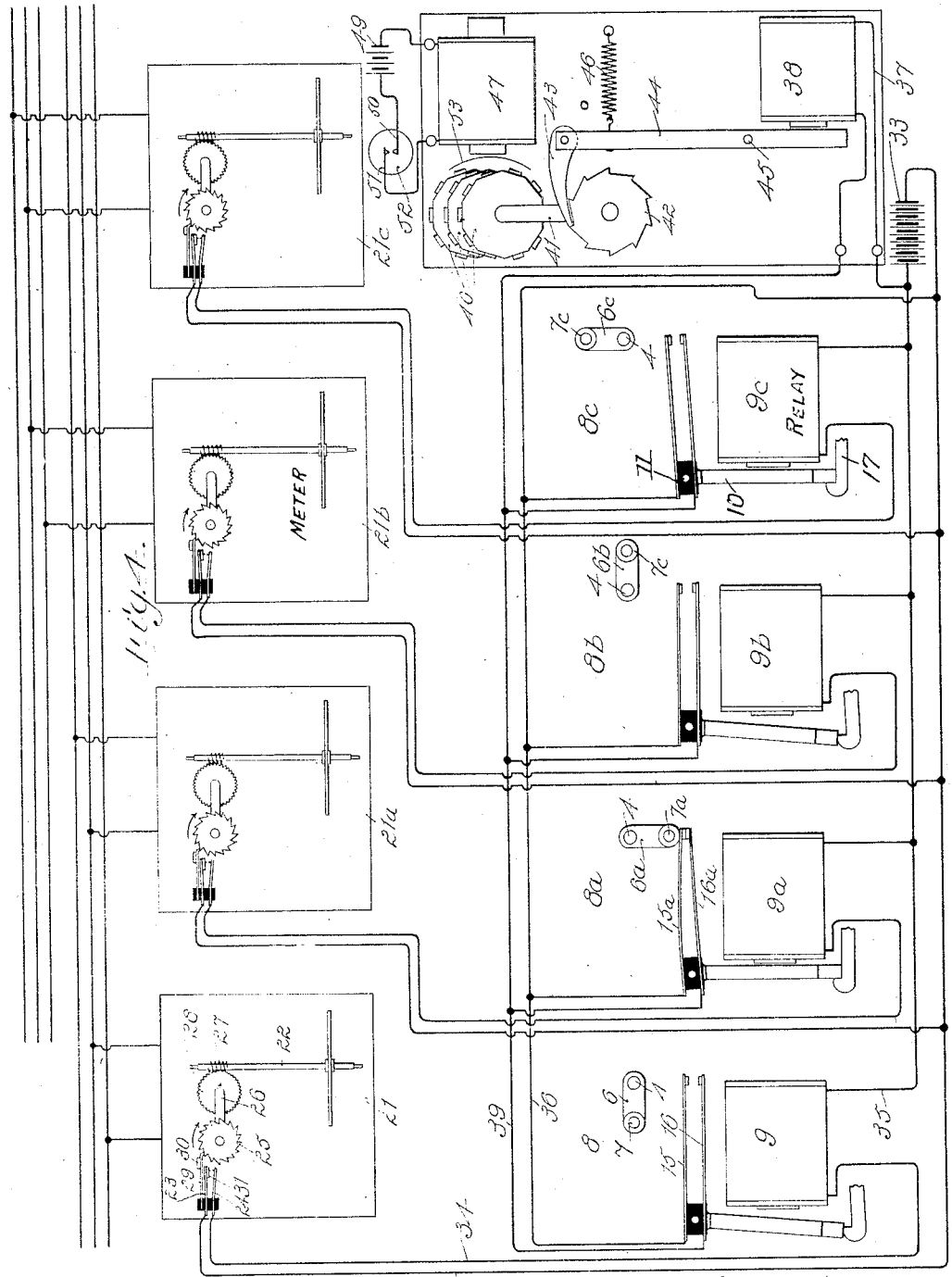

UNITED STATES PATENT OFFICE.

CHESTER I. HALL, OF FORT WAYNE, INDIANA, ASSIGNOR TO CHICAGO ELECTRIC METER COMPANY, OF CHICAGO, ILLINOIS, A CORPORATION OF ILLINOIS.

SYSTEM FOR RECORDING METER OPERATIONS.

1,221,443. Specification of Letters Patent. Patented Apr. 3, 1917.

Application filed March 10, 1913, Serial No. 753,256. Renewed July 14, 1916. Serial No. 109,392.

*To all whom it may concern:*

Be it known that I, CHESTER I. HALL, a citizen of the United States, residing at Fort Wayne, in the county of Allen and State of Indiana, have invented certain new and useful Improvements in Systems for Recording Meter Operations, of which the following is a full, clear, concise, and exact description, reference being had to the accompanying drawings, forming a part of this specification.

My invention relates to an improved mechanism by which the electricity measured by a plurality of electricity meters may be recorded by means of a single recording mechanism which operates to indicate the total electricity measured by all of said meters. My invention is particularly adapted to recording devices in which electromagnetic mechanism is actuated by a metering device when a certain quantity of current or energy has been metered and by my invention I provide against the possibility of current impulses from different ones of the meters acting upon the recording devices simultaneously, although the impulses may be simultaneously sent from the metering devices.

My invention further consists in mechanism for printing a record from the recording devices periodically by means of time-controlled apparatus.

These and other objects of my invention will appear more specifically by reference to the accompanying drawings, in which—

Figure 1 is a side view of the mechanism employed for receiving the impulses from the meters, either successively or simultaneously, and transferring them to the recording mechanism successively so that the recording mechanism in every case indicates the true sum of the meter readings.

Fig. 2 is an end view of the parts shown in Fig. 1.

Fig. 3 shows in a view similar to Fig. 2 the impulse transferring mechanism in its alternate position.

Fig. 4 is a diagrammatic view of the circuit connections employed between four meters and the impulse transferring mechanism and in this view there is also shown diagrammatically recording mechanism adapted to be actuated by said impulses.

Similar numerals refer to similar parts throughout the several views.

As shown in Fig. 1, my device consists of a constant speed motor 1, provided with a worm 2 upon its rotating shaft, which worm meshes with a worm wheel 3 rigidly carried by a shaft 4 supported in suitable bearings, one of which, 5, is shown. The shaft 4 has secured thereto a plurality of crank arms 6, $6^a$, $6^b$, $6^c$, provided with rollers 7, $7^a$, $7^b$, $7^c$. These crank arms are separated from each other angularly by such an amount that they are substantially equally spaced and they are retained in this position by means of suitable set screws, as indicated. The rollers, 7, $7^a$, $7^b$ and $7^c$ operate impulse transferring mechanisms, 8, $8^a$, $8^b$ and $8^c$, of which one is provided for each of the meters, the operation of which is to be recorded by the recording mechanism.

The impulse transferring mechanisms 8, $8^a$, $8^b$, $8^c$ are of identical construction, as a result of which it will be necessary to explain in detail but one of them, as, for example, the one shown at 8. Each of these devices consists of a suitable base upon which is mounted an electromagnet 9, having an armature 10 pivotally supported at 11 from a bracket 12 mounted upon said base. The armature 11 is normally held by a spring 13 in its retracted position and is preferably provided with an adjusting screw 14 for regulating the throw of the armature and also for serving as a nonfreezing point. The armature 10 has mounted upon it and insulated therefrom a pair of contact springs 15 and 16, so disposed relatively to the shaft 4 that the roller 7 passes over the ends of the springs when in its lowermost position and, when the armature 10 is in its attracted position, the right-hand ends of the contact springs 15 and 16 are raised sufficiently so that the spring 15 is depressed by the roller 7 into engagement with the spring 16. A spring latch 17 pivoted to the base at 18 and actuated by a spring 19 is provided to engage the armature 10 when it is moved to its attracted position by the energization of the electromagnet 9 and to hold said armature in said position until the latch is subsequently released. The latch has an arm 20 extending upwardly therefrom so that its upper end is in the path of the roller 7 near the end of the springs 15 and 16 when the latch is in its upper position, which is the position in which it holds the armature 10 in its attracted position. The upper end of the arm 20 is formed so as to serve as a cam when engaged by the roller 7 to depress the latch 17 from engagement with the armature 10, the rotation of the crank 6 being in the direction indicated by the arrows in Figs. 2 and 3.

From the above description, it will appear that the electromagnets of the impulse transferring mechanisms 8, 8$^a$, 8$^b$ and 8$^c$ may be energized either successively or simultaneously and that in either case the armatures of these impulse transferring mechanisms will be attracted and retained in attracted position until released by the successive engagement of the rollers 7, 7$^a$, 7$^b$, 7$^c$ with the cams carried by the latches of said impulse transferring mechanism. From the construction described, it will appear that this successive engagement between the rollers 7, 7$^a$, 7$^b$ and 7$^c$ with the latches is immediately after the contact springs of the impulse sending mechanisms have been pressed together by the corresponding rollers and that, therefore, the mechanism described constitutes a means for sending successive impulses into any desired totalizing mechanism corresponding in number to the impulses which energized the electromagnets of the impulse transferring mechanisms. The motor 1 and the gearing 2 and 3 are designed in every case so that the shaft 4 will make one rotation in considerably less time than the shortest time which can occur between successive energizations of any one of the electromagnets of the impulse transferring mechanisms. Obviously, as many impulse transferring mechanisms may be operated from the single shaft 4 as desired, the only requirement being that the cranks be practically equi-distant from each other angularly so that each impulse transferring mechanism may have ample opportunity to actuate the totalizing or recording devices. It will, of course, be understood that if the electromagnet of any impulse transferring mechanism is not energized for a considerable period, that the corresponding contacts are not brought together during this period and, therefore, during that time there is no operation of that particular impulse transferring mechanism.

As shown in Fig. 4, four electricity meters are indicated diagrammatically at 21, 21$^a$, 21$^b$, and 21$^c$ and, in the particular embodiment herein shown, each metering mechanism is arranged so that a rotating shaft 22 actuates spring contacts 23 and 24 every time a predetermined amount of electricity has been measured so that said contacts are brought into engagement with each other for an instant and immediately separated, so that the circuit controlled by these contacts may be closed only for such a length of time as is required to actuate the electromagnet of the impulse transferring mechanism, regardless of the speed of operation of the shaft 22. This contact mechanism consists essentially of a ratchet wheel 25 carried by the shaft 26, driven by means of a worm 27 and worm wheel 28 from the shaft 22. Upon the ratchet wheel there rests the end of a contact spring 29, which has rigidly secured thereto a weight 30. Immediately below the spring 29 is disposed the contact spring 23 which carries near its right-hand end a weight 31 and a contact adapted to engage a similar contact carried by the contact spring 24 disposed immediately below the weight 31. All of these springs are mounted preferably in an insulating support, as indicated, and operate as follows: When the end of the spring 29 passes from engagement with one of the teeth of the ratchet wheel 25, the flexure of the spring moves the weight 30 downward with considerable momentum, which is imparted to the spring 23 and thus to the weight 31, moving these parts down into engagement with the contact spring 24 which latter spring is stiff compared with the springs 23 and 29. The rebound of the weight 31 from this contact spring 24 is absorbed by the weight 30 so that a rebound downward on the part of the contact spring 23 is avoided and thus a single engagement between the contact springs 23 and 24 results for each tooth of the ratchet wheel 25 which passes under the right-hand end of the spring 29. This particular contact mechanism is not claimed in the present application as it forms the subject-matter of a copending application.

The spring contact 23 is connected by wire 32 with one terminal of the battery 33 and the spring contact 24 is connected by wire 34 with one terminal of the electromagnet 9, the other terminal of which is connected by wire 35 with the other terminal of the battery 33. The electromagnets 9$^a$, 9$^b$ and 9$^c$ of the other impulse transferring mechanisms are similarly connected with the contact mechanism actuated by the meters 21$^a$, 21$^b$, and 21$^c$. The contact springs 15 of the impulse transferring mechanism 8 is connected by wire 36 with one terminal of the battery 33, the other terminal of which is connected by wire 37 with one terminal of the electromagnet 38 of the recording mechanism. The other contact spring 16 of the impulse transferring mechanism 8 is connected by wire 39 with the other terminal of the electromagnet 38. The contact springs of the other impulse transferring mechanisms are similarly connected by wires 36 and 39 with the electromagnet 38 of the recording mechanism.

The recording mechanism, as indicated diagrammatically, consists of a plurality of printing wheels 40 mounted upon a shaft 41, actuated by a ratchet wheel 42 by means of a pawl 43 carried by the lever 44. The lever 44 is pivotally supported at 45 so that its lower end serves as an armature for the electromagnet 38 and, when not attracted by said electromagnet, the lever is moved to its retracted position by a spring 46. Thus, successive energizations of the electromagnet 38 serve to advance the shaft 41 by a step-by-step movement and thus the printing wheels 40, between which carry-over mechanism is preferably employed in a manner well-known in the art, although for the sake of clearness this carry-over mechanism is omitted in Fig. 4. A printing magnet 47 adapted to be energized from a battery 49 whenever the contacts 50 and 51 are closed by means of time-controlled mechanism 52 is provided to move a record strip 53 against the printing wheels 40. The time-controlled mechanism 52 is indicated diagrammatically and may consist of any devices adapted to periodically bring the contacts 50 and 51 into engagement with each other to thus give successive readings from the printing wheels 40 at equal time intervals from each other. The worm 27, worm wheel 28 and the ratchet wheel 25 are so proportioned that the impulses sent by the contacts 23 and 24 and subsequently recorded by the printing wheels 40 correspond to the actuation of the corresponding meter, so that the printed record is an indication, if desired, without further calculation, of the amount of flow through the meter.

From the description given above, it will appear that each metering mechanism actuates the contacts associated directly therewith to energize the electromagnet of its impulse transferring mechanism and that, as often as this occurs, the next rotation of the shaft 4 first moves the contacts 15 and 16 into engagement with each other, thus energizing the actuating magnet 38 of the recording mechanism and, immediately thereafter, releases the armature 10 of the impulse transferring mechanism, leaving it free to receive the next impulse from the metering mechanism.

As the speed of rotation of the shaft 4 is sufficiently rapid so that it makes one rotation in considerably less time than the shortest time which can occur between successive actuations of the contact mechanism of any one of the metering devices, it follows that all of the impulses sent from the metering devices to the impulse transferring mechanisms will be transferred successively through the wires 36 and 39 to the actuating magnet 38 of the recording mechanism, as a result of which the printing wheels 40 will at all times indicate the sum of the amounts of actuation of the metering devices and the records made by the operation of the recording magnet 47 will indicate the value of this sum at regularly recurring intervals of time.

It will be understood that, while I have shown my invention in the particular embodiment herein described, I do not, however, limit myself to these constructions, as many changes may be made without departing from the spirit of my invention. The essential feature of my invention is that the actuations of a plurality of metering mechanisms, occurring either regularly or irregularly, may be automatically transferred and integrated in a common totalizing device and also any mechanism for accomplishing this result electrically regardless of the nature of the metering devices or of the recording mechanism.

What I claim is:—

1. In a system for recording meter operation, the combination of individual contact mechanism to be actuated by each of a plurality of meters, a common recording mechanism having an electromagnetic actuating mechanism, and an impulse transferring mechanism for each meter comprising an electromagnet actuated by the meter contacts, and contact mechanism for controlling the actuating electromagnetic mechanism of the recording mechanism.

2. In a system for recording meter operation, the combination of individual contact mechanism to be actuated by each of a plurality of meters, a common recording mechanism having an electromagnetic actuating mechanism, and an impulse transferring mechanism for each meter comprising an electromagnet actuated by the meter contacts, contact mechanism for controlling the actuating electromagnetic mechanism of the recording mechanism, and devices for actuating the contacts of the impulse transferring mechanisms successively.

3. In a system for recording the actuations of a plurality of meters, the combination of contact mechanism for each meter, an electromagnet and controlling circuit connections for each contact mechanism, a locking device for each magnet, contacts for each magnet, recording mechanism having an electromagnetic actuating device, circuit connections extending from the contacts of each magnet to the actuating electromagnetic mechanism of the recording device.

4. In a system for recording the actuations of a plurality of meters, the combination of contact mechanism for each meter, an electromagnet and controlling circuit connections for each contact mechanism, a locking device for each magnet, contacts for each magnet, recording mechanism having an electromagnetic actuating device, circuit connections extending from the contacts of each magnet to the actuating electromagnetic mechanism of the recording device, and devices for successively operating the contacts associated with each magnet and releasing the associated locking mechanism.

5. In a system for recording the actuations of a plurality of meters, the combination of contact mechanism for each meter, an electromagnet and controlling circuit connections for each contact mechanism, a locking device for each magnet, contacts for each magnet, recording mechanism having an electromagnetic actuating device, circuit connections extending from the contacts of each magnet to the actuating electromagnetic mechanism of the recording device, and devices for successively operating the contacts associated with each magnet and releasing the associated locking mechanism, the operation of each magnet serving to move its contacts into position to be actuated by said devices to operate the electromagnetic actuating mechanism of the recording mechanism.

6. In a system for recording meter operation, the combination of individual contact mechanism to be actuated by each of a plurality of meters, a common recording mechanism having an electromagnetic actuating mechanism, and an impulse transferring mechanism for each meter comprising an electromagnet actuated by the meter contacts, contact mechanism for controlling the actuating electromagnetic mechanism of the recording mechanism, and time-controlled mechanism for making records from the recording mechanism at regularly recurring intervals.

7. In a system for recording meter operation, the combination of individual contact mechanism to be actuated by each of a plurality of meters, a common recording mechanism having an electromagnetic actuating mechanism, and an impulse transferring mechanism for each meter comprising an electromagnet actuated by the meter contacts, contact mechanism for controlling the actuating electromagnetic mechanism of the recording mechanism, devices for actuating the contacts of the impulse transferring mechanism successively, and time-controlled mechanism for making records from the recording mechanism at regularly recurring intervals.

8. In a system for recording the operation of a plurality of meters, the combination of a plurality of transferring mechanisms, one for each meter, connections between each meter and its transferring mechanism for communicating to said transferring mechanism the actuation of the meter, recording mechanism, and devices for transferring the meter actuations from the transferring mechanisms to the recording mechanism.

9. In a system for recording the operation of a plurality of meters, the combination of a plurality of transferring mechanisms, one for each meter, connections between each meter and its transferring mechanism for communicating to said transferring mechanism the actuation of the meter, recording mechanism, and devices for successively transferring the meter actuations from the transferring mechanisms to the recording mechanism.

10. In a system for recording the operation of a plurality of meters, the combination of a plurality of transferring mechanisms, one for each meter, connections between each meter and its transferring mechanism for communicating to said transferring mechanism the actuation of the meter, recording mechanism, and devices for transferring the meter actuations from the transferring mechanisms to the recording mechanism, whereby the recording mechanism will indicate the sum of the actuations of the several meters.

11. In a system for recording the operation of a plurality of meters, a plurality of impulse transferring mechanisms, one for each meter, connections between the meters and impulse transferring mechanisms for operating said impulse transferring mechanisms either successively or simultaneously as the case may be, a recording mechanism for indicating the total actuations of the meters, and connections between the impulse transferring mechanisms and the recording mechanism for successively actuating said recording mechanism.

12. In a system for recording the operation of a plurality of meters, a plurality of impulse transferring mechanisms, one for each meter, electrical connections between the meters and impulse transferring mechanisms for operating said impulse transferring mechanisms either successively or simultaneously as the case may be, a recording mechanism for indicating the total actuations of the meters, and electrical connections between the impulse transferring mechanisms and the recording mechanism for successively actuating said recording mechanism.

13. In an impulse transferring mechanism, the combination of an electromagnet, an armature, contacts mounted upon said armature, and a contact operating device engaging one of said contacts when said armature is in its attracted position but not when said armature is in its retracted position.

14. In an impulse transferring mechanism, the combination of an electromagnet, an armature, contacts mounted upon said armature, a contact operating device engaging one of said contacts when said armature is in its attracted position but not when said armature is in its retracted position, and a locking device for said armature.

15. In an impulse transferring mechanism, the combination of an electromagnet, an armature, contacts mounted upon said armature, a contact operating device engaging one of said contacts when said armature is in its attracted position but not when said armature is in its retracted position, and a locking device for said armature, said contact operating device engaging said locking device after operating the contacts to move the locking device to release said armature.

16. In an impulse transferring mechanism, the combination of an electromagnet, a rotor having cyclic motion, and switching mechanism moved into the path of said rotor by energization of said electromagnet.

17. In an impulse transferring mechanism, the combination of an electromagnet, a rotor having cyclic motion, switching mechanism moved into the path of said rotor by energization of said electromagnet, and a locking device for holding the switching mechanism in the path of said rotor upon actuation of said electromagnet.

18. In an impulse transferring mechanism, the combination of an electromagnet, a rotor having cyclic motion, switching mechanism moved into the path of said rotor by energization of said electromagnet, and a locking device for holding the switching mechanism in the path of said rotor upon actuation of said electromagnet, movement of said rotor to actuate said switching mechanism serving to subsequently release the locking mechanism.

19. In an impulse transferring mechanism, the combination of a plurality of devices each comprising an electromagnet, switching mechanism moved to an operative position by actuation of said magnet, and mechanism for actuating said switching mechanisms when in their operative positions.

20. In an impulse transferring mechanism, the combination of a plurality of devices each comprising an electromagnet, switching mechanism moved to an operative position by actuation of said magnet, and mechanism for successively actuating said switching mechanisms when in their operative positions.

21. In an impulse transferring mechanism, the combination of a plurality of devices each comprising an electromagnet, switching mechanism moved to an operative position by actuation of said magnet, mechanism for successively actuating said switching mechanisms when in their operative positions, and a locking device for holding each switching mechanism in its operative position, the actuation of the switching mechanisms by the actuating mechanism serving to release said locking devices.

22. In an impulse transferring mechanism, the combination of a plurality of devices, each comprising an electromagnet, an armature, and contacts carried by said armature, a rotary shaft, and crank arms carried by said shaft for engaging said contacts.

23. In an impulse transferring mechanism, the combination of a plurality of devices each comprising an electromagnet, an armature, and contacts carried by said armature, a rotary shaft, and crank arms carried by said shaft for successively engaging said contacts.

24. In an impulse transferring mechanism, the combination of an electromagnet, an armature, contacts carried by the armature, and a locking device for holding the armature in its attracted position, a rotary shaft, and crank arms carried by said shaft for successively engaging said contacts and releasing said locking devices.

25. In combination a plurality of meters, movable elements for said meters, setting of said elements being controlled by registration of a predetermined unit upon said meters, a register, having a testing member adapted to test said elements, said elements being adapted when set to engage said testing member and means controlled by engagement of said testing member with one of said elements for causing actuation of said register.

26. In combination a plurality of meters, a plurality of relays, movable elements adapted to be set by energization of said relays, contacts for controlling said relays, said contacts being operated by said meters, testing member for engaging said elements when the same are set, a registering device, means including a circuit having suitable contacts for operating said registering device controlled by engagement of said testing member with one of said elements.

27. In combination a plurality of independently actuated primary meters or registers, an accumulating meter or register, a testing member movable in a pre-determined path each of said primary meters having an element movable by registration of a predetermined value thereupon, into the said path of the testing member, and means controlled by engagement of said testing member and movable element for actuating said accumulating meter or register.

28. In combination a plurality of independently actuated primary registers, an accumulating register, a testing member movable in a predetermined path, each of said primary registers having an element movable by registration of a predetermined value into the path of said testing member, means controlled by engagement of said testing member with a movable element for actuating said accumulating register and means to restore each movable element.

29. In combination, a plurality of independently actuated primary elements, a registering device, a movable testing member having a predetermined path of movement, a contact element normally out of the path of said testing member, each of said primary elements having means adapted to be actuated upon predetermined conditions for causing the corresponding contact element to intersect the path of said testing member, and means governed by engagement of said testing member and an intersecting one of said contact elements for actuating said register.

30. In combination, a register, a moving testing device, a plurality of normally retracted fingers adapted to be set into the path of said testing device, means governed by engagement of said testing device and one of said fingers for operating said register.

31. In combination, a register, a movable testing device, a plurality of normally retracted fingers adapted to be set into the path of said testing device, means governed by engagement of said testing device and one of said fingers for operating said register, and means operated after contact of said testing device and one of said fingers for permitting said finger to be retracted.

In witness whereof, I hereunto subscribe my name this 3rd day of March, A. D. 1913.

CHESTER I. HALL.

Witnesses:
LESLIE W. FRICKE,
LEONARD W. NOVANDER.